Feb. 10, 1953  K. C. CRUMRINE  2,628,315
SUBSURFACE PROSPECTING
Filed Nov. 25, 1949

INVENTOR.
KENNETH C. CRUMRINE
BY
ATTORNEYS

Patented Feb. 10, 1953

2,628,315

UNITED STATES PATENT OFFICE 2,628,315

SUBSURFACE PROSPECTING

Kenneth C. Crumrine, Tulsa, Okla., assignor to The Texas Company, New York, N. Y., a corporation of Delaware Application November 25, 1949, Serial No. 129,421

3 Claims. (Cl. 250—83.6)

This invention relates to radiological well logging and more particularly to that form of logging of formations traversed by a bore hole in which a source of radioactivity such as a mixture of radium and beryllium is passed through the hole and a record made of the effect of the bombardment of the formation by penetrative radiation from the source.

In sub-surface prospecting apparatus such as that disclosed in Patent No. 2,316,329 of April 13, 1943 to D. G. C. Hare, a detector is used with a source of radiation separated therefrom by a shield, the radiation passing outwardly into the formation in all directions. In such case, the benefit of the large part of the radiation discharged in directions away from the detector is lost, particularly the neutrons which produce gamma rays from the formation.

It is an object of this invention to provide a novel method and apparatus wherein such losses or waste of radiation are minimized and the quality of the log correspondingly improved.

Still another object of the invention is the provision of a novel method and apparatus wherein the desired radiation from the source is concentrated in a manner to be more effective as respects the detector and the logging results.

Figure 1:
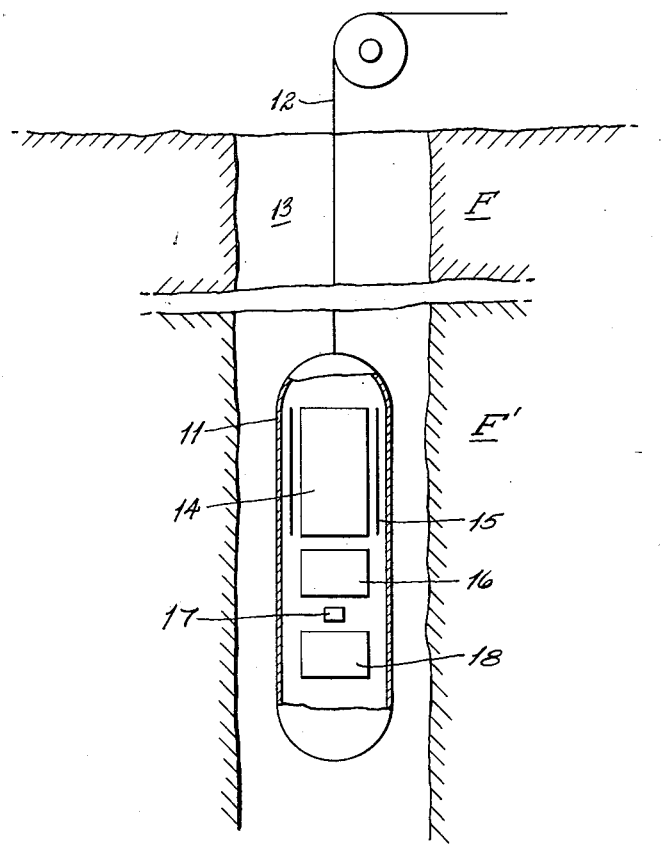
Figure 2:
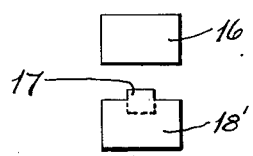

Further objects and advantages of the invention will appear from the following description and attached claims taken in connection with the accompanying drawing wherein Figure 1 is a sectional elevation through a bore hole containing an instrument embodying the invention and Figure 2 is a modification of the source and scattering elements used in the apparatus shown in Figure 1.

In brief, the present invention involves the concentration of the desired radiation from a source in a manner such that this radiation is more effective upon that part of the formation exposed to the detector. Preferably, this is accomplished by the use of suitable reflecting means such as heavy water and carbon (graphite) properly disposed relative to the source of radiation.

In a typical neutron-gamma ray logging device, an elongated housing capable of being passed through a bore hole usually contains suitable amplifying and transmitting apparatus connected to the surface elements, a source of neutrons and gamma rays such as a mixture of radium and beryllium, a detector and a shield to shield the detector from primary gamma rays from the source. A material such as tungsten is suitable as such a shield. In some cases, it is desirable to provide a shield around the detector to absorb scattered primary rays. This shield is less effective in absorbing the gamma rays induced by the neutrons from the source since such gamma rays are harder than the relatively soft scattered primary gamma rays from the source.

The present invention contemplates the use of a given source and a suitably shielded detector and the increasing of the desired radiation such as the usable neutrons by the use of what might be termed a neutron scatterer or screening element which is so positioned as to prevent waste of neutrons that might otherwise be lost as respects the logging operation. By using a reflector or scatterer that reflects only usable neutrons and does not reflect gamma rays to any appreciable degree, the number of usable neutrons is increased while the number of undesirable or disturbing gamma rays remains substantially the same.

An application of the invention is shown in Figure 1 wherein an elongated housing 11 of well known form is supported by a cable 12 in a manner to be moved up and down in a bore hole 13 passing through a series of different formations F and F'. Cable 12 contains the necessary electrical cables and connections to the surface equipment which is well known and includes a measuring device to determine the depth of housing 11 as well as suitable amplifying and recording means for the various electrical impulses received from the detector.

A gamma ray detector 14 is mounted in housing 11, preferably of the type disclosed in Patent No. 2,390,071 of March 19, 1946 to D. G. C. Hare, such detector having been found to be much more efficient than other known types of gamma-ray radiation detectors. Detector 14 is preferably surrounded by a sleeve 15 of a gamma-ray absorptive material sufficiently thick to absorb the low energy scattered primary gamma rays, i. e., scattered primary gamma rays from the source hereinafter described that would normally pass through the detector and is sufficiently thin to permit the passage to the detector of high energy secondary gamma rays, i. e., the gamma rays induced in the formation by the neutron bombardment from the source. A shield 16 of gamma-ray absorptive material is provided at one end of detector 14, such shield being formed of material of high density such as lead, gold or tungsten which inhibits the passage of radiation directly to the detector. A source 17 to neutrons and gamma rays is provided at the opposite end of the shield, the arrangement being such that detector 14 is protected substantially from direct radiation from source 17.

With the arrangement thus far described, penetrative radiation is discharged in all directions from source 17, about 50% thereof being discharged downwardly in a direction away from detector 14 and into the formation at angles such that a very small proportion, if any, is returned to the detector either as scattered primary gamma rays or as gamma rays induced by neutrons.

To prevent such waste of radiation and subsequently increase the efficiency of the logging, a mass or block 18 of heavy water or carbon (graphite) is positioned below the source so that a large proportion of the neutrons discharged thereagainst are scattered in a manner such that they are reflected upwardly and outwardly into the formation in regions wherein gamma rays induced thereby can be detected readily by detector 14. Substantially all the primary gamma rays from the source continue in their original paths through such material and are not reflected. Deutero wax or other deuterium compounds may be used. Other materials such as paraffin, oil, water or like hydrogen-containing material may be used but are not preferred because of their large cross section for the capture of neutrons.

In Figure 1, scatterer or reflector 18 is shown as spaced from source 17. Figure 2 illustrates a modified arrangement wherein source 17 is partially nested in a block 18' of reflecting or scattering material whereby the desired scattering of neutrons emanating from source 17 in the desired direction is accomplished to even a greater extent.

In operation, housing 11 is passed through bore hole 13 and neutrons from source 17 are discharged into the formation surrounding the hole. Because of the use of scatterer 18 or 18', the number of neutrons made available in the surrounding formation as respects the detector is greatly increased, particularly in proportion to the undesired primary gamma rays from the source, and the efficiency of the device correspondingly increased.

Obviously many modifications and variations of the invention as above set forth may be made without departing from the spirit and scope thereof, and, therefore, only such limitations should be imposed as are indicated in the appended claims.

I claim:

1. A device adapted to be passed through a bore hole to determine the nature and location of formations traversed by said hole comprising an elongated housing, a source of neutrons and gamma rays in said housing, said source comprising a mixture of radium and beryllium, a gamma ray detector in said housing, a shield between said source and said detector of a character to inhibit the passage of radiation directly from said source to said detector, and a screening element on the side of said source opposite the shield side of a material capable of reflecting neutrons from said source in directions generally toward the shield side of said source and substantially incapable of reflecting gamma rays from said source whereby the neutrons and gamma rays from said source are separated and the neutrons directed to a region adjacent the detector.

2. A device adapted to be passed through a bore hole to determine the nature and location of formations traversed by said hole comprising an elongated housing, a source of neutrons and gamma rays in said housing, said source comprising a homogeneous mixture of radium and beryllium, a gamma ray detector in said housing, a shield between said source and said detector of a character to inhibit the passage of radiation directly from said source to said detector, and a scattering element on the side of said source opposite the shield side and arranged to enclose partially an adjacent portion of said source, said element being of a material capable of reflecting neutrons from said source in directions generally toward the shield side of said source and substantially incapable of reflecting gamma rays from said source.

3. In the process of investigating formations traversed by a bore hole in which a source of neutrons and gamma rays in the form of a homogeneous mixture of radium and beryllium is passed through the hole together with a detector disposed at one vertical side of said source and capable of detecting gamma rays liberated by bombardment of formations with neutrons from said source, the method of increasing the number and effectiveness of the neutrons emitted from the source which comprises shielding the detector from radiation passing directly toward the detector from the source and selectively reflecting into the formations surrounding the detector neutrons initially leaving said source in a direction substantially vertically opposite from said detector so that these last-named neutrons will supplement the neutrons producing said gamma-ray liberation.

KENNETH C. CRUMRINE.

REFERENCES CITED

The following references are of record in the file of this patent:

UNITED STATES PATENTS

| Number | Name | Date |
|---|---|---|
| 2,275,748 | Fearon | Mar. 10, 1942 |
| 2,302,247 | Neufeld | Nov. 17, 1942 |
| 2,316,329 | Hare | Apr. 13, 1943 |
| 2,508,772 | Pontecorvo | May 23, 1950 |

OTHER REFERENCES

Nuclear Fission and Atomic Energy, Wm. E. Stephens, The Science Press, Lancaster, Pa., 1938. page 123.